United States Patent
Waage-Rasmussen et al.

(10) Patent No.: US 12,291,938 B2
(45) Date of Patent: May 6, 2025

(54) RUNNING TOOL FOR A DOWNHOLE APARATUS FOR PATCHING A WALL OF CONDUIT AND A METHOD OF PATCHING A CONDUIT

(71) Applicant: ISEALATE AS, Stavanger (NO)

(72) Inventors: Einar Waage-Rasmussen, Hommersåk (NO); Bengt Gunnarsson, Hundvåg (NO)

(73) Assignee: ISEALATE AS, Stavanger (NO)

( * ) Notice: Subject to any disclaimer, the term of this patent is extended or adjusted under 35 U.S.C. 154(b) by 0 days.

(21) Appl. No.: 17/913,642

(22) PCT Filed: Mar. 23, 2021

(86) PCT No.: PCT/NO2021/050074
§ 371 (c)(1),
(2) Date: Sep. 22, 2022

(87) PCT Pub. No.: WO2021/194348
PCT Pub. Date: Sep. 30, 2021

(65) Prior Publication Data
US 2023/0103962 A1   Apr. 6, 2023

(30) Foreign Application Priority Data
Mar. 23, 2020   (NO) .................................. 20200342

(51) Int. Cl.
*E21B 36/00*   (2006.01)
*E21B 29/10*   (2006.01)
(Continued)

(52) U.S. Cl.
CPC ............ *E21B 33/138* (2013.01); *E21B 29/10* (2013.01); *E21B 36/00* (2013.01); *E21B 43/103* (2013.01); *E21B 43/105* (2013.01)

(58) Field of Classification Search
CPC ........ E21B 29/10; E21B 36/00; E21B 43/103; E21B 43/105
See application file for complete search history.

(56) References Cited

U.S. PATENT DOCUMENTS

| 5,186,215 A | 2/1993 | Gilleland | |
| 8,800,650 B2 * | 8/2014 | Spray | E21B 17/00 166/207 |
| 10,808,876 B2 * | 10/2020 | Gunnarsson | E21B 17/00 |

FOREIGN PATENT DOCUMENTS

| WO | 2015/128454 | 9/2015 |
| WO | 2017/146593 | 8/2017 |

OTHER PUBLICATIONS

International Search Report and Written Opinion of the ISA dated May 31, 2021, for PCT/NO2021/050074, 9 pp.
(Continued)

*Primary Examiner* — Catherine Loikith
(74) *Attorney, Agent, or Firm* — Nixon & Vanderhye P.C.

(57) ABSTRACT

A running tool for running an apparatus for patching a wall of a downhole casing and activating the apparatus in a location in the conduit includes a rolled up or curled up piece of material for patching the wall. The piece of material has a surface comprising an adhesive compound for fastening the piece of material securely to the wall of the casing. The running tool has a heater for providing heat for the apparatus for heating the compound and a forcing device for applying a force to the piece of material for forcing or holding the piece of material against the wall of the casing.

17 Claims, 5 Drawing Sheets

(51) Int. Cl.
*E21B 33/138* (2006.01)
*E21B 43/10* (2006.01)

(56) References Cited

OTHER PUBLICATIONS

Norwegian Office Action dated Sep. 30, 2020, in NO 20200342, 6 pp.
Norwegian Search Report dated Sep. 29, 2020, in NO 20200342, 2 pp.

* cited by examiner

RUNNING TOOL FOR A DOWNHOLE APARATUS FOR PATCHING A WALL OF CONDUIT AND A METHOD OF PATCHING A CONDUIT

CROSS-REFERENCE TO RELATED APPLICATIONS

This application is the U.S. national phase of International Application No. PCT/NO2021/050074 filed Mar. 23, 2021 which designated the U.S. and claims priority to NO 20200342 filed Mar. 23, 2020, the entire contents of each of which are hereby incorporated by reference.

The present invention relates to the field of running tools. More specifically, it relates to a particular running tool for running an apparatus for patching a wall of a conduit to and activating the apparatus in a location in the conduit and to a method of patching a conduit.

It is often necessary to move apparatuses to and to use said apparatuses in conduits, such as wellbores or pipelines, for several different purposes. The different purposes may include e.g. washing of the conduit, clearing of debris from the conduit, installation or retrieval of equipment from the conduit, maintenance of the conduit or repair of the conduit.

For different purposes, different apparatuses may be required. For different apparatuses, different running tools may be required.

In a first aspect, the invention relates to a running tool for running an apparatus for patching a wall of a conduit to and activating the apparatus in a location in the conduit, wherein the apparatus comprises a rolled up or curled up piece of material for patching the wall, wherein the piece of material has a surface comprising an adhesive compound for fastening the piece of material securely to the wall of the conduit, and wherein the running tool comprises a heater for providing heat for the apparatus for heating the compound and a forcing device for applying a force to the piece of material for forcing or holding the piece of material against the wall of the conduit.

The apparatus may be an apparatus for patching a wall of a damaged conduit for repairing the damaged conduit. The piece of material may be a patch for being applied to a damaged portion of a damaged conduit for repairing the damaged conduit. The piece of material may also be referred to as a "liner" or a "sheet". The piece of material may be a metal patch, such as a steel patch, or e.g. a patch made from any other material suitable for the purpose.

The adhesive compound may have a characteristic that may be improved with increasing temperature, at least up to a certain temperature. The certain temperature may be e.g. 50 degrees Celsius, 75 degrees Celsius, 90 degrees Celsius or 100 degrees Celsius, less than 50 degrees Celsius or more than 100 degrees Celsius.

The adhesive compound may have a characteristic that may be improved when a temperature of the adhesive is increased at least up to a certain temperature, wherein said temperature is higher than a typical wellbore temperature, and wherein the heater is configured for heating the compound to an advantageous temperature to improve the characteristic.

The heater may be a heat source that may heat a compound to a temperature that changes at least one attribute of the compound. The heater may be capable of heating said compound to a temperature of over 1, 10, 25, 50, 60, 70, 80, 90 or 100 degrees Celsius or more. The heater may be capable of heating said compound to said temperature even if the compound is applied to a piece of material and said material is located some distance from said heater, e.g. 1 centimetre away from said heater, more than 1 centimetres away from said heater, more than 5 centimetres away from said heater, more than 10 centimetres away from said heater, more than 20 centimetres away from said heater, or more than 50 centimetres away from said heater.

The compound may e.g. be an adhesive compound. One or more adhesive characteristics may be improved with increasing temperature up to the certain temperature. Alternatively the compound may e.g. be a compound that becomes slippery when it is heated to or above the certain temperature, or a compound that changes a state from e.g. a liquid state to a solid state when it is heated to or above the certain temperature.

The heater may be arranged around a portion of a core, central, longitudinal axis of the running tool. The heater may cover a portion of said longitudinal axis of the running tool. The heater may be arranged around a mandrel of the running tool. The heater may comprise e.g. a heating coil and/or a heating mat and/or a heater cable. The heater may be imbedded into a type of rubber element, such as a rubber tube, or another suitable element of a suitable material. The heater may alternatively comprise a heating source for heating a fluid and means for circulating heated fluid to the piece of material to heat the piece of material.

The running tool may comprise a compartment for holding the apparatus. The running tool may further comprise a sleeve for selectively covering at least a portion of an outer side of the compartment, for protecting the apparatus from an environment in the conduit during transportation of the apparatus to the location in the conduit. When in position and when ready for activation of the apparatus, the sleeve may be pulled back to facilitate for activation of the apparatus and a release of the piece of material.

Alternatively or additionally to a sleeve, the apparatus or one or more parts of the apparatus, such as e.g. the piece of material, may be protected by other protective means, such as e.g. a tissue, such as e.g. a permeable tissue. The other protective means may be configured for opening upon activation of the apparatus and/or release of the piece of material. The other protective means may e.g. be tearable, and tear open upon release of the piece of material.

The compartment may be of a length, to sufficiently fit the apparatus in the compartment, of up to one metre, of up to three metres, of up to five metres, of up to seven metres, of up to ten metres, or of more than ten metres. In some embodiments, typically, but not exclusively, when the compartment is of modest length, e.g. of less than three metres of length or less than one metre of length, the running tool may comprise a sleeve that is capable of fully covering the compartment. In other embodiments, typically, but not exclusively, when the compartment is of more considerable length, e.g. of more than three metre or more than one metre, the running tool may comprise a sleeve that is capable of only partly covering the compartment. The heater may be arranged in the compartment, e.g. on an inside of the piece of material in the compartment or integrated into an expandable rubber/material element.

The running tool or the apparatus may comprise a locking device for keeping the piece of material releasably locked in a passive state, to avoid premature release of the piece of material, to keep the piece of material in place in the running tool. The running tool may comprise an actuator or device for activating the apparatus to release the piece of material. The actuator or device may comprise a release mechanism for releasing the locking device. Release of the locking device may activate the apparatus.

The locking device may e.g. be a wire, strap, or rope of a suitable material bound around one or more portions of the piece of material, or it may e.g. be a mechanical locking device.

The forcing device may be a device for applying a force to the apparatus or a part of the apparatus such as the piece of material, for forcing the piece of material into an active position or for holding the piece of material in the active position. The active position may be a position against a wall of the conduit, and the device may be a device for forcing the piece of material against the wall. The forcing device may be e.g. a mechanical device, such as a jack, or it may e.g. be a bladder device. The forcing device may comprise the heater or a portion or part of the heater. The forcing device may e.g. be advantageous to hold the piece of material in a position while an adhesive act to fasten the piece of material to the conduit.

The forcing device may be arranged to provide a force to the apparatus to activate the apparatus and/or to release the piece of material from being locked in a passive state. A force from the forcing device may be applied to release the piece of material from the locking device.

The piece of material may be biased to uncurl or unroll upon activation. The piece of material may move into an active state upon activation. The active state may be a state wherein the piece of material is forced against the wall of the conduit. The piece of material may be biased such as to force itself against the wall as it uncurls or unrolls. Alternatively, the forcing device may be configured to uncurl or unroll the piece of material. A combination of the piece of material being biased to uncurl or unroll and using the forcing device to uncurl or unroll the material is also a possibility and may be beneficial. The combination may e.g. ensure an improved connection between the wall and the piece of material.

The forcing device may be arranged inside the compartment, arranged on an inside of the compartment relative to the piece of material. The forcing device may be an expandable device, and expansion of the device may then force the piece of material outwards.

The compound may e.g. be an adhesive for fastening the piece of material securely to a wall of the conduit, e.g. by gluing the piece of material to the wall of the conduit. The compound may be a type of glue, a resin, or an epoxy.

One or more adhesive qualities of the compound may be improved by increasing the temperature of the compound up to a certain temperature. E.g. a bonding strength provided by the adhesive may be increased by a heating up of the adhesive and/or a set time of the adhesive may be increased by a heating up of the adhesive. The heating up may be e.g. a heating up by 20 degrees Celsius, 40 degrees Celsius, 60 degrees Celsius, 80 degrees Celsius, 100 degrees Celsius or more than 100 degrees Celsius, from e.g. a typical borehole temperature. The set time may be the time it takes for the adhesive to set/to cure/to harden. The bonding strength may be the strength of a bond created by the adhesive to bind a piece of material to a wall of a conduit. The heater may be configured for heating the compound to a temperature that increases one or more adhesive qualities of the compound. The heater may be configured to provide said heating up of the adhesive.

The piece of material may be locked, e.g. in a rolled up or curled up state, by a locking device for keeping the material from unrolling or uncurling. The release device of the running tool may be configured for releasing the locking device for activating the piece of material by allowing it to uncurl or unroll.

The running tool may comprise a plurality of compartments. The running tool may comprise a plurality of apparatuses. The running tool and/or the apparatus may comprise a plurality of pieces of material. Furthermore, the running tool may comprise an actuator, or a plurality of actuators, for activating the plurality of apparatuses and/or for releasing the plurality of pieces of material. The actuator or plurality of actuators may be configured for allowing release of the plurality of pieces of material at a determined time and/or place in the conduit. Each of the plurality of pieces of material may be released at separate times.

The running tool may be a running tool configured for setting a plurality of pieces of material. The running tool may be a running tool configured for setting a plurality of pieces of material, and/or for setting each of the plurality of pieces of material at a determined time and in a determined position in a conduit. Each piece of material may be set separate from the other pieces of material in position and/or time. A running tool with a plurality of pieces of material has the clear advantage that it enables setting a plurality of patches for patching a conduit in one run of the running tool.

A number of the plurality of pieces of material may be set overlappingly e.g. to repair a damage of a conduit of a size that it would not be possible or at least impractical to repair by use of simply one piece of material. Alternatively, or additionally, more than one of the plurality of pieces of material may be set in different, non-overlapping positions in a conduit e.g. to repair a more than one damaged sections of the conduit.

The heater of the running tool may be arranged such that it is usable for heating any one of the plurality of pieces of material after setting of the any one piece of material. The heater may e.g. be arranged in a certain position on the running tool, and the running tool may be moved such that after setting one of the plurality of pieces of material the heater is positioned to heat said one of the pieces of material. Likewise, the running tool may comprise one forcing device that may be positioned after setting a piece of material by moving of the running tool for applying a force to the piece of material.

Alternatively, the running tool may comprise a plurality of heaters and/or a plurality of forcing devices. In embodiments of the running tool, it may have one heater and one forcing device for each one of the plurality of pieces of material, e.g. arranged in each of the compartments of the running tool, arranged to respectively heat or force the a corresponding piece of material after release of said corresponding piece of material without having to re-position the running tool for the heating or forcing. In embodiments of the running tool, a heater and/or a forcing device may be arranged on an inside of each of a plurality of compartments, on an inside of a position for the piece or pieces of material in the compartments.

In a second aspect, the invention relates to a method of patching a conduit, the method comprising:
providing the running tool according to the first aspect of the invention in a conduit;
running the running tool into a location in the conduit;
activating the apparatus to release the piece of material and allow the piece of material to uncurl or unroll;
forcing the piece of material against a wall of the conduit by use of the forcing device;
providing heat to the piece of material by use of the heater of the running tool to heat up the compound on the piece of material to facilitate a binding between the wall and the piece of material.

The step of providing heat for heating up the piece of material and the compound on the piece of material may typically be performed after the step of activating the apparatus and releasing the piece of material, but may alternatively and/or additionally in some embodiments of the method be performed prior to and/or during the step of activating the apparatus and releasing the piece of material.

The method may comprise the step of using the release mechanism to release a locking device to unlock the piece of material, to release the piece of material. Release of the locking device may allow the piece of material to uncurl or unroll, and/or may be said to activate the apparatus. Providing heat prior to release of the piece of material may be beneficial to prepare the material for unrolling or uncurling and for connecting to the wall of the conduit.

The method may comprise the step of using the forcing device to force the piece of material against the wall while the piece of material fastens to the wall. The piece of material may be held against the wall while the heater heats the compound for the compound to reach a temperature where it becomes adhesive or where its adhesive qualities improves. The heater may be turned off while the piece of material is held against the wall. The piece of material may be held against the wall while the compound cools after the heater has been turned off, e.g. for the adhesive compound to set and to bind the piece of material to the wall of the conduit.

The method may further comprise:
applying the compound to the piece of material;
curling or rolling the piece of material up so as to insert it into a compartment of the running tool for later release of the material; and
locking the curled up or rolled up piece of material by use of a locking device so as to keep it in the curled up or rolled up state until selectively releasing the piece of material from the curled up or rolled up state by releasing the locking device.

The method may further comprise:
covering at least a part of the compartment by use of a sleeve; and
uncovering the at least a part of the compartment by pulling back the sleeve.

The method step of covering at least a part of the compartment by use of a sleeve may be a step of fully covering the compartment by use of a sleeve. The method step of uncovering the at least a part of the compartment by pulling back the sleeve, may be a step of fully uncovering the compartment by pulling back the sleeve.

The steps of activating the apparatus to release the piece of material and allow the piece of material to uncurl or unroll, forcing the piece of material against a wall of the conduit by use of the forcing device and providing heat to the piece of material by use of the heater of the running tool may be steps relating to a first apparatus and a first piece of material. The method may include a step to move the running tool to position the heater relative to the first piece of material for heating the first piece of material, and/or moving the running tool to position the forcing device for forcing the first piece of material against the wall of the conduit.

The method may further comprise the step of releasing a second piece of material and allow the second piece of material to uncurl or unroll. The method may further comprise the step of forcing the second piece of material against the wall of the conduit by use of the forcing device.

The method may comprise repeating the steps of the last two paragraphs for any one or more of a plurality of pieces of material. For each of the pieces of material, the method may comprise the step of moving the running tool for release of the piece of material and/or for heating up the piece of material and/or for forcing the piece of material against the wall of the conduit.

In a third aspect, the invention relates to a running tool for a downhole apparatus for patching a wall of a conduit, wherein the apparatus comprises a plurality of pieces of material for patching the wall of the conduit, and wherein the running tool comprises one or more compartments for holding the plurality of pieces of material, and wherein the running tool is arranged for allowing selective release of the plurality of pieces of material.

The running tool may be a running tool for running the downhole apparatus to a position in a wellbore and for activating the apparatus in the wellbore.

"Selective release" may mean a type of controlled release, that may be controlled by an operator e.g. either through remote activation of the running tool or the apparatus or through a pre-planned and pre-programmed release based on timing or positioning of the running tool in the conduit.

When referring to "the running tool", reference may be made to any one or both of the running tool according to the first aspect of the invention and the running tool according to the third aspect of the invention. The running tool according to the first aspect of the invention may comprise any one or all of the features of the running tool according to the third aspect of the invention, and/or the running tool according to the third aspect of the invention may comprise any one or all of the features of the running tool according to the first aspect of the invention.

The running tool may comprise one or more actuators for activating the apparatus for release of one or more of the plurality of pieces of material. In some embodiments of the running tool, the running tool may be arranged to release each of the plurality of pieces of material one at a time, based on a timer, following activation of the apparatus. In other embodiments, the running tool may be arranged to release a first of the plurality of pieces of material upon a first activation, a second of the plurality of pieces of material upon a second activation, and so on if there are more than two pieces of material.

The running tool may comprise a plurality of actuators. The actuators may be all of similar type, or of different types, including, but not limited to, a ball-drop actuator, an electric actuator, a hydraulic actuator, or any other type of actuator suitable for the purpose. The running tool may comprise at least one compartment for each one of the plurality of pieces of material. The running tool may further comprise a sleeve for each one of the compartments, or for some of the compartments, for fully or partly selectively covering the compartments. Each sleeve may be movable, typically axially, in a longitudinal direction on the running tool. This may be beneficial to be able to protect a piece of material when running the running tool into position in a conduit but be able to release the piece of material when the running tool is in position for release of the piece of material.

The running tool may comprise one or more centralizers, and/or one or more settable packers. The one or more centralizers may be advantageous to enable accurate positioning of the running tool in the conduit. The one or more packers may be advantageous to enable a sealing of a portion of the conduit, to enable a build-up of fluid pressure in the conduit.

The running tool may be configured for setting a plurality of patches in a single run-in of the running tool in the conduit.

In a fourth aspect, the invention relates to a method of patching a conduit, the method comprising:
- providing the running tool according to the third aspect of the invention in a conduit;
- running the running tool into a location in the conduit;
- releasing a first piece of material for patching a first damaged portion of the conduit;
- moving the running tool within the conduit; and
- releasing a second piece of material for patching a second damaged portion of the conduit.

The step of releasing the second piece of material may be performed after the step of releasing the first piece of material, without removal of the running tool from the conduit in the time between setting the first and setting the second piece of material.

The method may comprise the step of moving the running tool within the conduit and the step of releasing a piece of material for patching a damaged portion of the conduit for a number of subsequent pieces of material after the second piece of material. This may be performed without removal of the running tool from the conduit between setting any of the pieces of material. The steps may be performed all during a single run-in of the running tool in the conduit. The second damaged portion of the conduit may be a portion of the conduit directly above or below the first damaged portion. The second piece of material may be released such that it at least partially overlaps the first piece of material. Any subsequent piece of material may be set to overlap any previous piece of material against a wall of the conduit after being set.

The release of the pieces of material may cause the pieces of material to uncurl or unroll and to force themselves against a wall of the conduit, for repairing the damaged portion of the conduit. The damaged portion of the conduit may typically be a damaged wall of the conduit.

When referring to "the method", reference may be made to any one or both of the method according to the second aspect of the invention and the method according to the fourth aspect of the invention. The method according to the fourth aspect of the invention may comprise any one or more of the features of the method according to the second aspect of the invention. The method according to the second aspect of the invention may comprise any one or more of the features of the method according to the fourth aspect of the invention.

The method may comprise running the running tool into a position for setting a patch, then setting a packer prior to setting of the patch, to position the running tool securely in position in the conduit, and/or to seal off an area of the conduit in which to set the patch.

There is further described a further alternative of a running tool for a downhole apparatus for patching a wall of a conduit, wherein the running tool does not comprise a heater. The further alternative of the running tool may have any one or more of the features of the running tool according to the first aspect of the invention and/or the running tool according to the third aspect of the invention, except for the heater.

In embodiments of the running tool, the piece of material may comprise a variant of the adhesive for which a temperature in the conduit may be sufficient to prepare the adhesive for setting against the wall of the conduit.

Any step of heating the apparatus or the piece of material or the adhesive in the method according to the second aspect of the invention or according to the fourth aspect of the invention may be a step of heating the apparatus or the piece of material or of heating the adhesive by use of an ambient temperature in the wellbore.

In the following is described examples of preferred embodiments illustrated in the accompanying drawings, wherein.

Note that the figures are not accurate depictions of the invention but schematic representations of embodiments of the invention. The figures are not drawn to scale.

Figure 1:
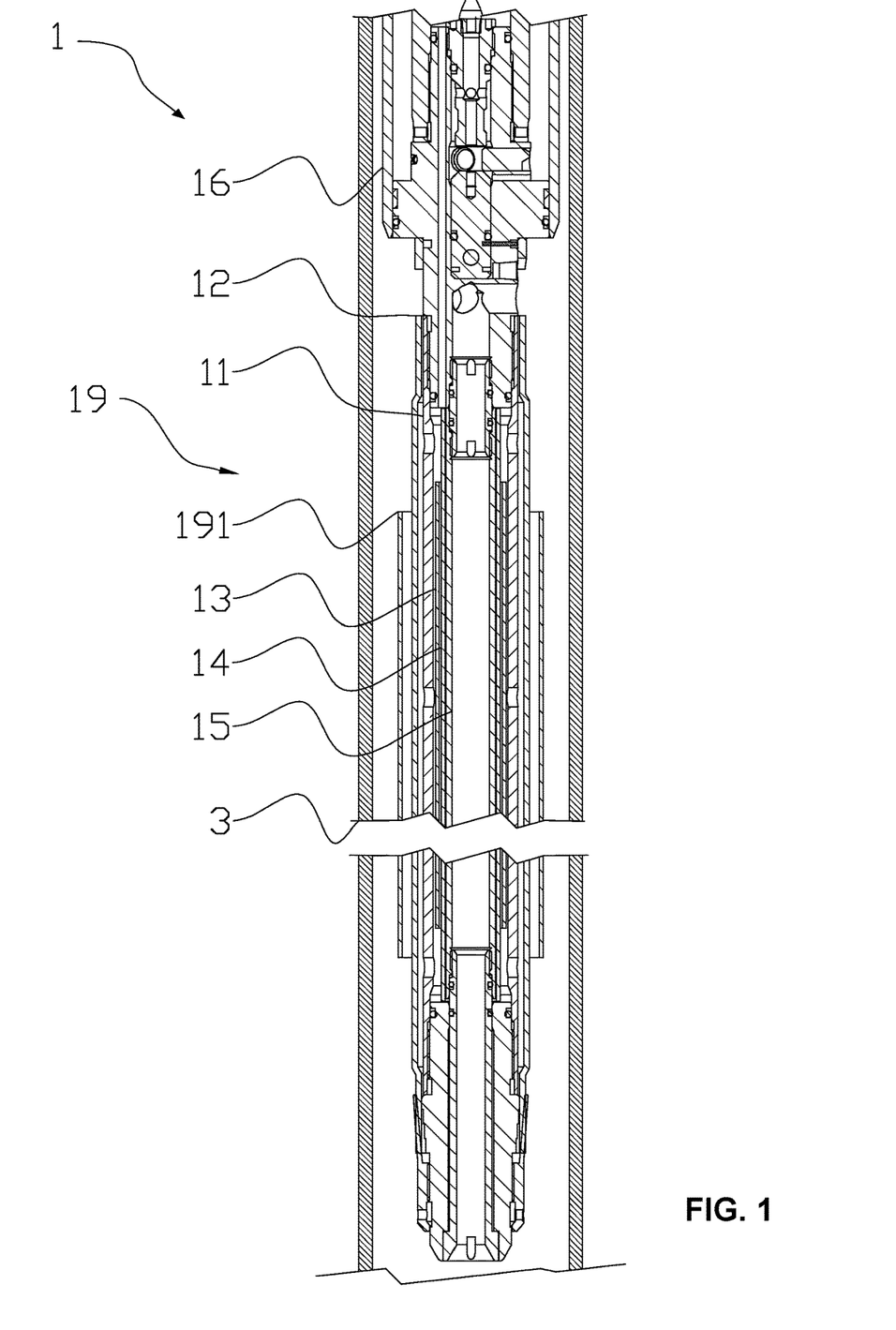
FIG. 1 shows a cross-sectional view of an embodiment of the running tool according to the first aspect of the invention.

FIG. 1 shows an embodiment of the running tool 1 according to the first aspect of the invention which carries an embodiment of the apparatus 19 inside a casing 3. The embodiment of the apparatus 19 shown comprises a rolled-up, spring-biased piece of material 191 for patching the casing 3. The piece of material 191 has a layer of an adhesive compound—an epoxy—on its outer surface, to facilitate securely fastening of the piece of material 191 to the casing 3. The running tool 1 has a tool body 11, a tube for bypass-flow 15 in a centre of the running tool 1, and an outer sleeve 16. The sleeve 16 is shown in a pulled-back state, to allow for deployment/activation of the apparatus 1.

To avoid having the piece of material 191 fastening to itself in its rolled-up state, or to a part of the running tool 1, the epoxy used will only become adhesive when heated to a certain temperature. The running tool 1 has a heating element 13 on an inside of the tool body 11, to provide the heat required to make the epoxy adhesive. A ventilation tube 14 is also provided in the running tool 1. The ventilation tube 14 is insulated towards the heating element 13, to reduce a loss of energy/heat from the heating element 13 towards the ventilation tube 14 and the tube for bypass-flow 15.

Further, the running tool 1 has an expandable, inflatable tube section 12—an embodiment of a forcing device 12—to, when inflated, force the piece of material 191 of the apparatus 19 against the casing 3. As can be seen, the forcing device 12 is arranged on an inside of the piece of material 191 in the running tool 1.

Figure 2:
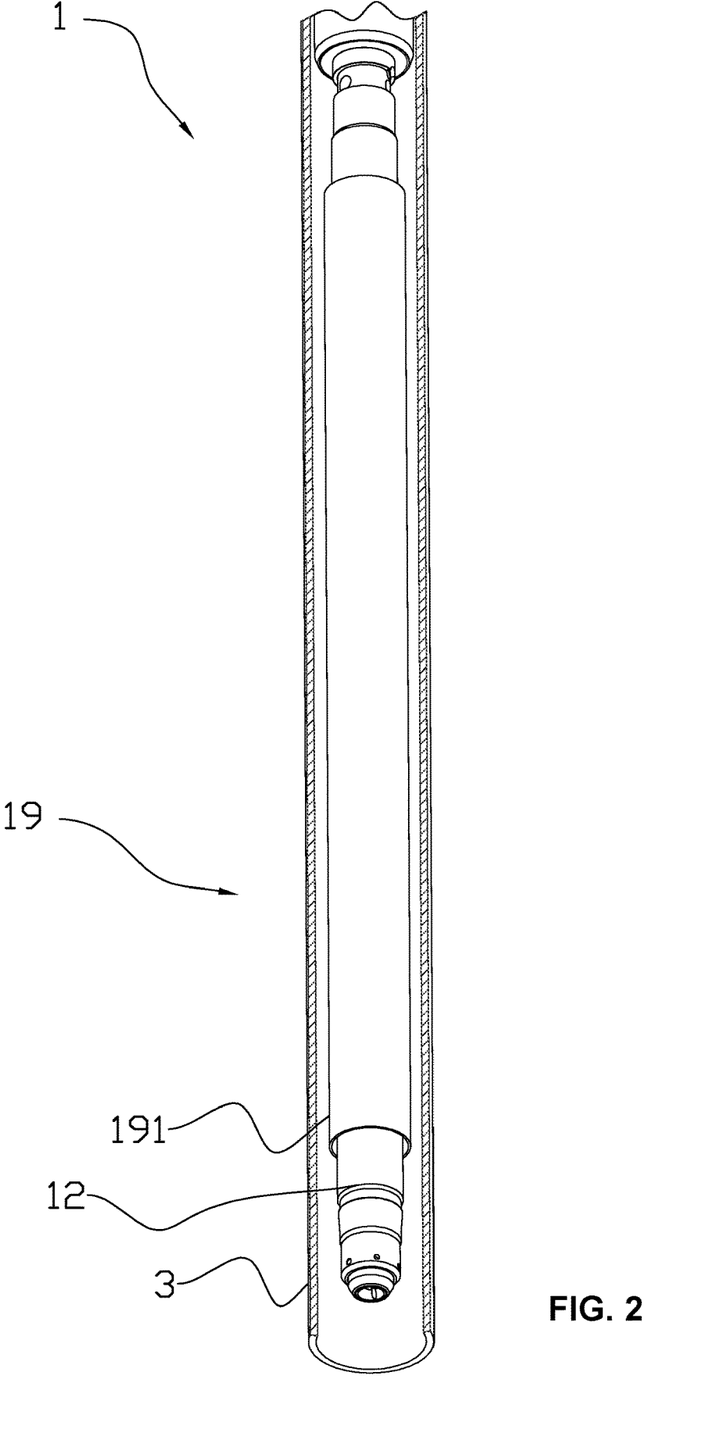
FIG. 2 shows an embodiment of the running tool comprising an embodiment of the apparatus, prior to activating the apparatus.

FIG. 2 shows the running tool 1 with the apparatus 19 comprising a rolled-up piece of material 191 in a casing 3. The running tool 1 has an inflatable tube 12 for forcing the piece of material 191 against the casing 3 upon activation of the apparatus 19.

Figure 3:
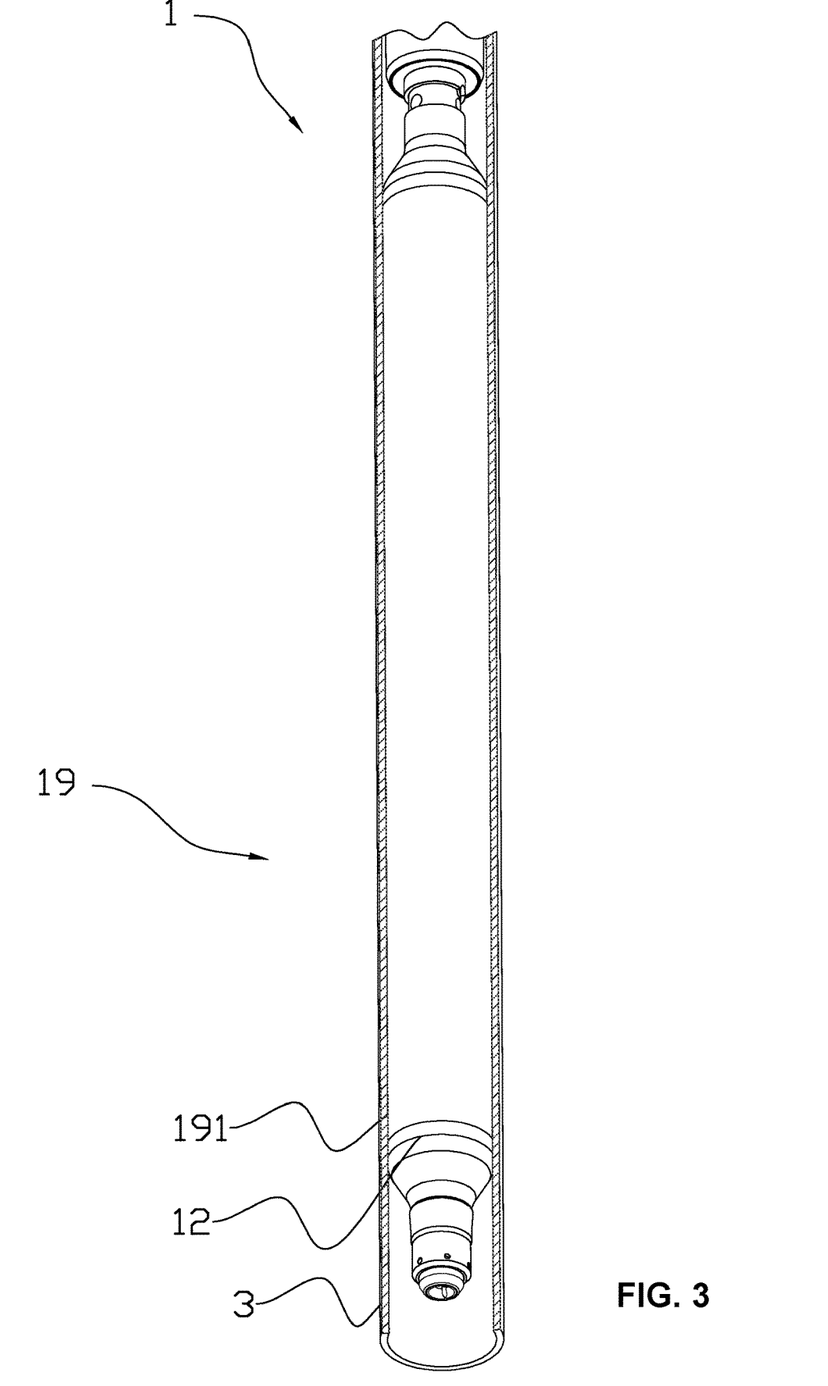
FIG. 3 shows an embodiment of the running tool comprising an embodiment of the apparatus, with the apparatus activated.

FIG. 3 shows the running tool 1 and apparatus shown in FIG. 2, after activation of the apparatus 19, release of the piece of material 191, and inflation of the inflatable tube 12. In this state, the inflatable tube 12 pushes and holds the piece of material 191 against the casing 3, to keep the piece of material 191 in place while, by use of the adhesive, the piece of material 191 fastens securely to the casing 3.

Figure 4:
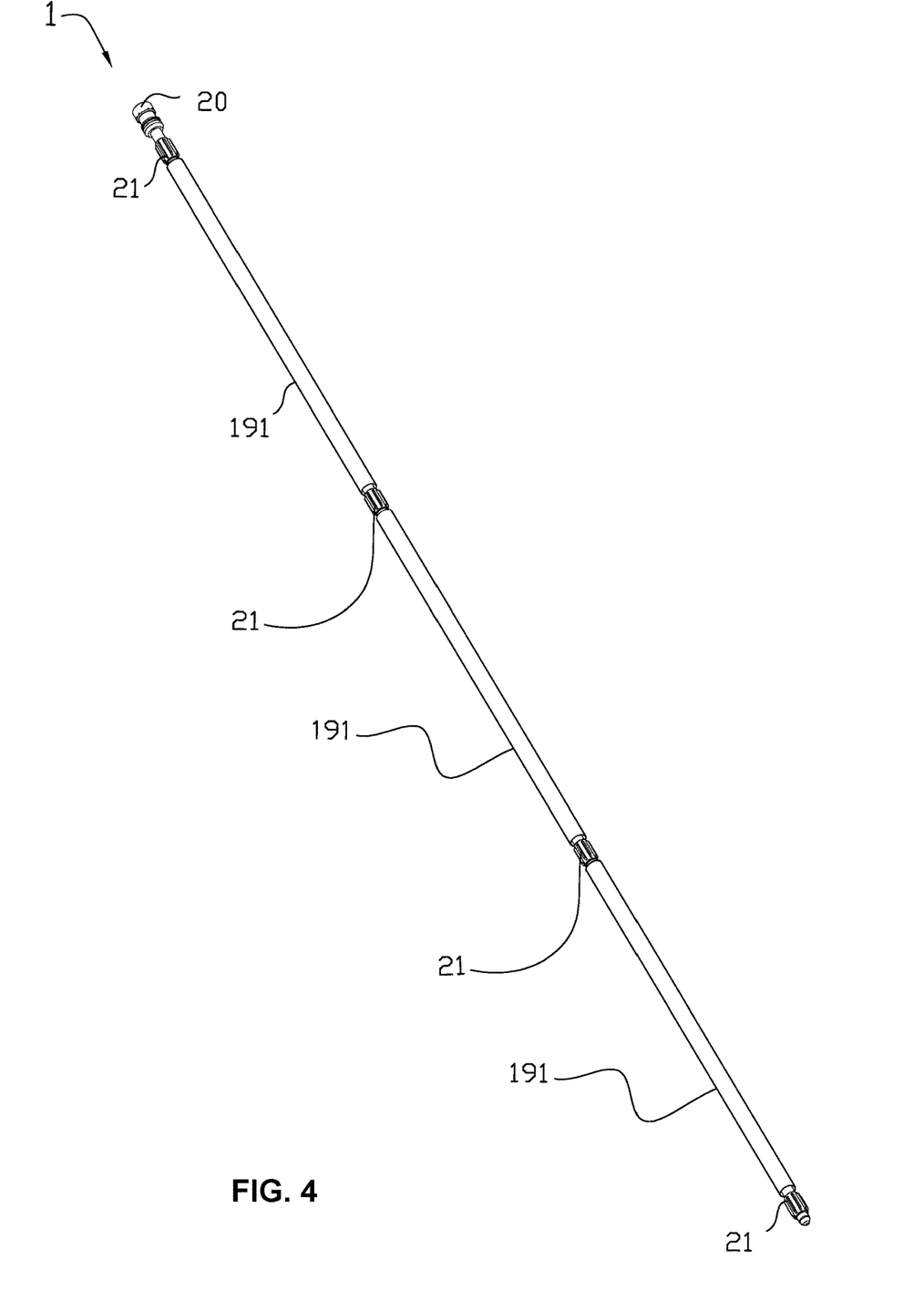
FIG. 4 shows an embodiment of the running tool in accordance with the third aspect of the invention.

FIG. 4 shows an embodiment of the running tool 1 having a plurality of pieces of material 191. In this particular embodiment, the running tool 1 has three pieces of material 191. Furthermore, shown in FIG. 4, is a connector 20, and four centralizers 21 for holding the running tool 1 centralized in a conduit (not shown) when run into the conduit. Not shown, but present in the running tool 1, is one forcing device 12 in the form of an inflatable packer 12 for each of the pieces of material 191. Other parts, not shown, may include a number of actuators used for activating the apparatus for release of the pieces of material 191, one or more heaters (not shown) for heating the pieces of material 191, and other features of the apparatus and/or running tool as described herein.

Figure 5:
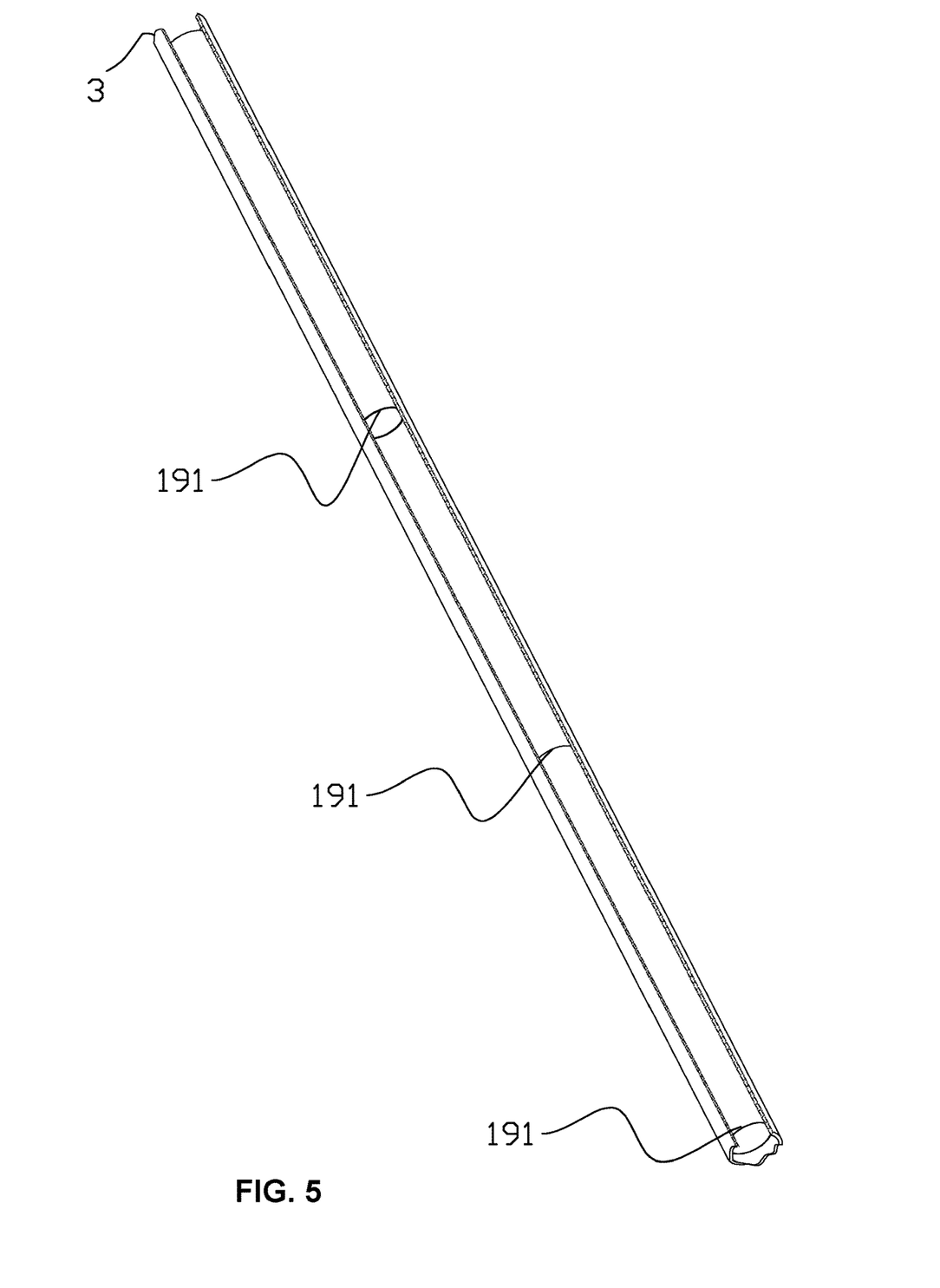
FIG. 5 shows a conduit that has been patched by three patches in series, by use of the running tool in accordance with the third aspect of the invention.

FIG. 5 shows a casing 3 that has been patched by three pieces of material 191, set over-lappingly in series for patching a section of the casing 3 greater than any single patch. For example, each patch may be three metres of length, and set overlappingly to patch an area of the casing 3 eight metres of length.

In another, not shown embodiment, the running tool may e.g. be used to set four two-metres long patches in series to cover a 7 metres long area of the conduit. Yet another not shown example may be using the tool to set five patches, each in different positions, to patch five different damaged smaller areas of the conduit in one run of the running tool in the conduit.

A method of setting multiple patches may typically, but not necessarily and not exclusively, involve the following steps:
a) running in a version of the running tool into a production tubing in a wellbore, the running tool comprising the apparatus and e.g. five pieces of material, each material having a surface covered by an adhesive and being rolled up or curled up in a compartment of the running tool separate from other pieces of material;
b) moving the running tool to a position for setting a first of the five pieces of material;
c) actuating the apparatus to release the first of the five pieces of material;
d) forcing the first of the five pieces of material against a wall of the production tubing by inflating an inflatable packer and thereby using the forcing device, to repair a damaged portion of the wall of the production tubing;
e) heating up the first of the five pieces of material by use of the heater, by circulating hot water to the first of the five pieces of material, to aid the setting of the adhesive and the piece of material to the wall of the production tubing;
f) deflating the inflatable packer, thereby releasing the force against the first of the five pieces of material, when the piece of material is sufficiently set against the wall, to facilitate movement of the running tool; and
g) repeating steps b through f for the second, the third, the fourth and the fifth of the five pieces of material.

It should be noted that the above-mentioned embodiments illustrate rather than limit the invention, and that those skilled in the art will be able to design many alternative embodiments without departing from the scope of the appended claims. It should be noted that running tool 1 may be used with another apparatus 19 than the embodiment or embodiments of apparatus 19 described above.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:

1. A running tool for a downhole apparatus for patching a wall of a casing in a wellbore, wherein the apparatus comprises:
a plurality of pieces of material for patching the wall of the casing,
wherein the running tool comprises one or more compartments configured to hold the plurality of pieces of material for being released for patching the wall of the casing, and wherein the running tool is arranged for allowing selective release of the plurality of pieces of material, wherein the running tool further comprises:
a forcing device configured to apply a force to each said piece of material for forcing or holding the piece of material against the wall of the casing,
wherein the forcing device includes an expandable device, and
wherein the tool further comprising a hydraulic actuator configured to expand the expandable device.

2. The running tool according to claim 1, wherein the running tool is configured for setting a plurality of patches in a single run-in of the running tool in the casing.

3. A method of patching a casing in a wellbore, the method comprising:
providing the running tool according to claim 1 in the casing;
running the running tool into a location in the casing;
releasing a first piece of material for patching a first damaged portion of the casing;
moving the running tool within the casing; and
releasing a second piece of material for patching a second damaged portion of the casing.

4. A running tool for running an apparatus for patching a wall of a casing in a wellbore and activating the apparatus in a location in the casing, the apparatus comprising:
a rolled up or curled up piece of material configured to patch the wall, wherein the piece of material has a surface comprising a heat-activatable adhesive compound configured to fasten the piece of material securely to the wall of the casing,
wherein the running tool comprises a heater configured to provide heat for the apparatus and heat the compound, and a forcing device configured to apply a force to the piece of material for forcing or holding the piece of material against the wall of the casing,
wherein the forcing device includes an expandable device, and
wherein the forcing device further comprises at least one actuator configured to expand the expandable device, the at least one actuator including an hydraulic actuator.

5. The running tool according to claim 4, wherein the running tool comprises a compartment for holding the piece of material.

6. The running tool according to claim 5, wherein the running tool comprises a sleeve for selectively covering an outer side of the compartment, for protecting the piece of material from an environment in the casing during transportation of the apparatus to the location in the casing.

7. The running tool according to claim 4, wherein the forcing device is arranged inside of the piece of material in the tool prior to a release of the piece of material.

8. The running tool according to claim 7, wherein the expandable device is arranged, upon expansion of the forcing device, to force the piece of material against the wall of the casing.

9. The running tool according to claim 4, wherein the heater is located inside the heat-activatable adhesive compound in the running tool and controllable to selectively apply heat to the piece of material whilst downhole in the wellbore.

10. The running tool according to claim 9, wherein the heater surrounds a mandrel or longitudinal axis of the running tool, the heater comprising a heating coil, a heating mat, a heater cable, or a heated rubber tube, the heater being positioned within 5 cm from the piece of material when the heater is activated to heat the piece of material.

11. The running tool according to claim 4, wherein the adhesive compound has a characteristic that is improved when a temperature of the adhesive is increased at least up to a certain temperature, wherein said temperature is higher than a typical wellbore temperature, and wherein the heater is configured for heating the compound to an advantageous temperature to improve the characteristic.

12. The running tool according to claim 4, wherein the running tool comprises a plurality of pieces of material for patching the casing, and wherein the running tool is configured for setting more than one of the plurality of pieces of material in one run-in in the casing.

13. The running tool according to claim 12, wherein the running tool comprises a plurality of actuators for activating the apparatus for release of one or more of the plurality of pieces of material.

14. The running tool according to claim 4, wherein the running tool comprises a plurality of compartments for holding a plurality of pieces of material.

15. The running tool according to claim 4, wherein the at least one actuator includes a plurality of actuators configured to expand the expandable device, the plurality of actuators includes the hydraulic actuator and an electric actuator.

16. A method of patching a casing in a wellbore, the method comprising:
 providing the running tool according to claim 1 in the casing;
 running the running tool into a location in the casing;
 activating the apparatus to release the piece of material and allow the piece of material to uncurl or unroll;
 forcing the piece of material against a wall of the casing by use of the forcing device including an expandable device; and
 providing heat to the piece of material by use of the heater of the running tool to heat up the compound on the piece of material to facilitate a binding between the wall and the piece of material.

17. The method according to claim 16, wherein the running tool comprises a plurality of pieces of material, the method further comprising:
 moving the running tool after having set a first of the plurality of pieces of material; and
 repeating the releasing, forcing and providing heat for one or more subsequent pieces of material, and then again moving the running tool after setting each of the one or more subsequent pieces of material.

* * * * *